United States Patent
Clark et al.

(10) Patent No.: US 10,768,740 B2
(45) Date of Patent: Sep. 8, 2020

(54) INPUT AXIS ROTATIONS

(71) Applicant: Hewlett-Packard Development Company, L.P., Houston, TX (US)

(72) Inventors: Alexander W. Clark, Houston, TX (US); Kent E. Biggs, Tomball, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/772,470

(22) PCT Filed: Mar. 3, 2016

(86) PCT No.: PCT/US2016/020693
§ 371 (c)(1),
(2) Date: Apr. 30, 2018

(87) PCT Pub. No.: WO2017/151136
PCT Pub. Date: Sep. 8, 2017

(65) Prior Publication Data
US 2018/0329564 A1    Nov. 15, 2018

(51) Int. Cl.
*G06F 3/041*        (2006.01)
*G06F 3/0488*       (2013.01)
*G06F 3/042*        (2006.01)

(52) U.S. Cl.
CPC .......... *G06F 3/0416* (2013.01); *G06F 3/0421* (2013.01); *G06F 3/0488* (2013.01); *G06F 3/04883* (2013.01); *G06F 2203/0339* (2013.01)

(58) Field of Classification Search
CPC .... G06F 3/0412; G06F 3/0421; G06F 3/0488; G06F 3/04883; G06F 2203/0339
See application file for complete search history.

(56) References Cited

U.S. PATENT DOCUMENTS 6,567,101 B1    5/2003  Thomas
8,402,391 B1 *  3/2013  Doray .................. G06F 3/0482
                                               715/834

(Continued)

FOREIGN PATENT DOCUMENTS

EP        2437147 A1      4/2012
WO   WO-2015042444 A1     3/2015

OTHER PUBLICATIONS

Heo, S, et al. "Designing Rich Touch Interaction Through Proximity and 2.5D Force Sensing Touchpad." Ozchi 13, Nov. 25-29, 2013. Adelaide, Australia.

*Primary Examiner* — Amare Mengistu
*Assistant Examiner* — Crystal Mathews
(74) *Attorney, Agent, or Firm* — HP Inc. Patent Department

(57) ABSTRACT

Example implementations relate to touch-sensitive input devices. As an example, a non-transitory computer readable storage medium comprises instructions that when executed cause a controller of an electronic device to receive, via a touch-sensitive input device of the electronic device, a touch input. The instructions also cause the controller to determine whether the touch input corresponds to a re-orientation input. The instructions further cause the controller to, in response to a determination that the touch input corresponds to the re-orientation input, rotate an input axis associated with the touch sensitive input device from a first orientation to a second orientation based on the re-orientation input.

20 Claims, 6 Drawing Sheets

(56) References Cited

U.S. PATENT DOCUMENTS

| | | | |
|---|---|---|---|
| 8,508,475 B2* | 8/2013 | Gear | G06F 1/1626 345/157 |
| 8,553,001 B2* | 10/2013 | Krishnaswamy | G06F 3/04883 178/18.01 |
| 8,749,493 B2 | 6/2014 | Zadesky et al. | |
| 9,128,552 B2* | 9/2015 | Case | G06F 3/041 |
| 9,223,340 B2* | 12/2015 | Locker | G06F 1/1605 |
| 9,417,733 B2* | 8/2016 | Chou | G06F 3/04883 |
| 2007/0063987 A1 | 3/2007 | Sato | |
| 2007/0300182 A1* | 12/2007 | Bilow | G06F 3/0488 715/799 |
| 2009/0100343 A1* | 4/2009 | Lee | G06F 3/04817 715/733 |
| 2009/0184936 A1 | 7/2009 | Algreatly | |
| 2010/0053109 A1* | 3/2010 | Narita | G06F 3/0418 345/173 |
| 2010/0177931 A1* | 7/2010 | Whytock | G06F 3/0416 382/103 |
| 2011/0001628 A1* | 1/2011 | Miyazawa | G01C 21/3664 340/686.1 |
| 2011/0016749 A1 | 1/2011 | Callahan et al. | |
| 2011/0102333 A1* | 5/2011 | Westerman | G06F 3/04883 345/173 |
| 2011/0134047 A1* | 6/2011 | Wigdor | G06F 3/04883 345/173 |
| 2011/0169749 A1* | 7/2011 | Ganey | G06F 1/1626 345/173 |
| 2011/0279384 A1 | 11/2011 | Miller et al. | |
| 2012/0001858 A1* | 1/2012 | Matsuda | G06F 3/0482 345/173 |
| 2012/0038546 A1* | 2/2012 | Cromer | G06F 1/1626 345/156 |
| 2012/0092283 A1* | 4/2012 | Miyazaki | G06F 3/042 345/173 |
| 2013/0083074 A1* | 4/2013 | Nurmi | G06F 3/0488 345/650 |
| 2013/0125045 A1 | 5/2013 | Sun et al. | |
| 2013/0127750 A1* | 5/2013 | Horiuchi | G06F 3/0416 345/173 |
| 2013/0222275 A1 | 8/2013 | Byrd et al. | |
| 2013/0229361 A1* | 9/2013 | Brown | G06F 3/0488 345/173 |
| 2013/0275907 A1* | 10/2013 | Lau | G06F 3/04886 715/773 |
| 2014/0015792 A1* | 1/2014 | Chen | G06F 3/041 345/174 |
| 2014/0168118 A1* | 6/2014 | Wang | G06F 3/03547 345/173 |
| 2014/0218290 A1 | 8/2014 | Meijer | |
| 2014/0354695 A1* | 12/2014 | Sakai | H04N 21/4312 345/650 |
| 2015/0293616 A1 | 10/2015 | Cheng | |
| 2015/0370414 A1* | 12/2015 | Innami | G06F 3/04845 715/773 |
| 2016/0109861 A1* | 4/2016 | Kim | G04G 17/04 368/69 |
| 2017/0118402 A1* | 4/2017 | Bok | G06F 3/04883 |

* cited by examiner

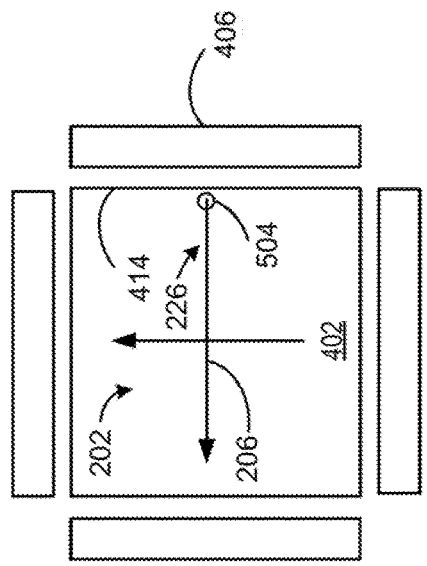
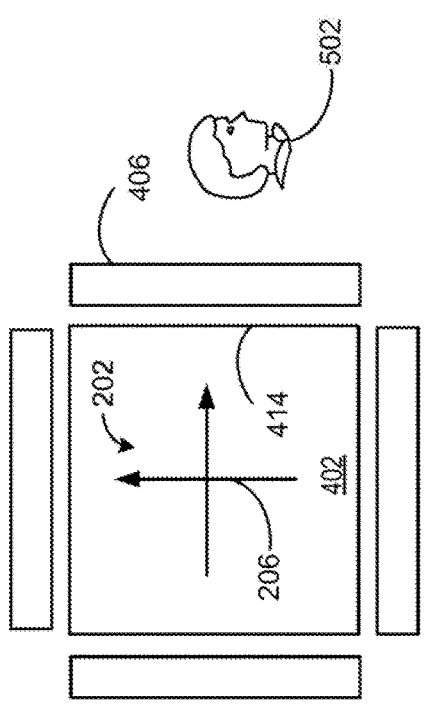
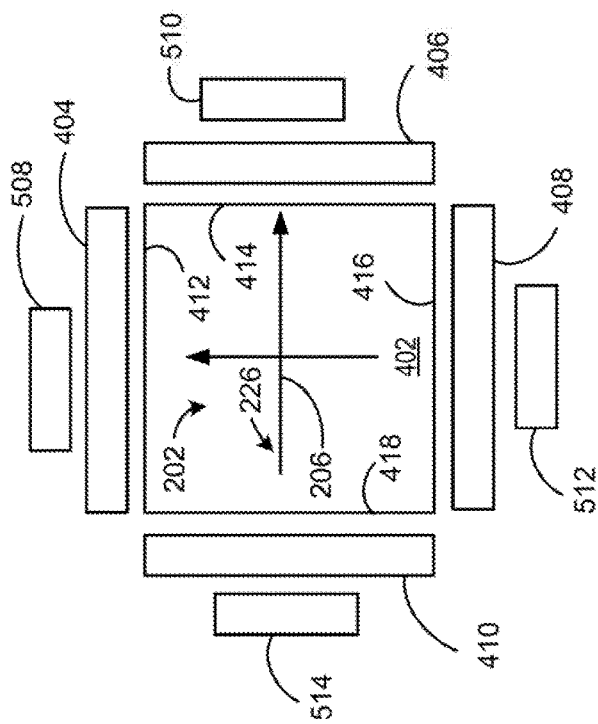
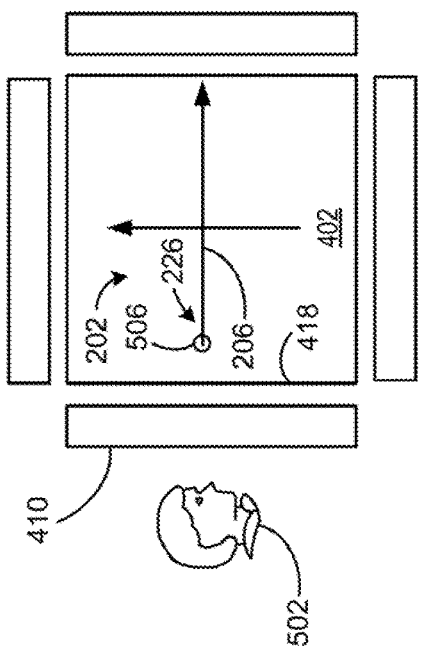

INPUT AXIS ROTATIONS

BACKGROUND

An electronic device may be attached to an input device to receive input from a user of the computing device. For example, an input device may be a keyboard or a computer mouse. Some electronic devices, such as a notebook computer, may have an integrated input device, such as an integrated keyboard.

BRIEF DESCRIPTION OF THE DRAWINGS

Some examples of the present application are described with respect to the following figures:

FIGS. 5A-5B illustrate a process of a touch-sensitive input device rotating an input axis based on a triggering of a sensor, according to an example;

FIG. 5C illustrates a process of a touch-sensitive input device rotating an input axis based on a triggering of a sensor, according to another example;

FIG. 5D illustrates a process of a touch-sensitive input device rotating an input axis based on a triggering of a sensor, according to another example.

DETAILED DESCRIPTION

One type of input device that is becoming more common than keyboard or computer mouse is a touch-sensitive input device. A touch-sensitive input device may translate the movements of a writing tool (e.g., a user's finger or a stylus) to a relative position in a graphical user interface (GUI). An example of a touch-sensitive input device may be a touchpad. Another touch-sensitive input device may be a touchscreen.

A touch-sensitive input device may include an input axis to translate a movement of a writing tool to a relative position in a GUI. However, the input axis may be a fixed input axis designed to face a sole, individual user. When a user is not directly facing the input axis, the touch-sensitive input device may not translate the movements from the user's finger to the correct position in a GUI. Thus, the convenience of using the touch-sensitive input device may be decreased.

Examples described herein provide a touch-sensitive input device that rotates an input axis to align the input axis to a user of the touch-sensitive input device. For example, a non-transitory computer readable storage medium comprising instructions that when executed cause a controller of an electronic device to receive, via a touch-sensitive input device of the electronic device, a touch input. The instructions also cause the controller to determine whether the touch input corresponds to a re-orientation input. The instructions further cause the controller to, in response to a determination that the touch input corresponds to the re-orientation input, rotate an input axis associated with the touch sensitive input device from a first orientation to a second orientation based on the re-orientation input.

As another example, a non-transitory computer-readable storage medium comprising instructions that when executed cause a controller of an electronic device to detect, via a light-sensitive sensor of the electronic device, a direction of a user gesture relative to a side of a touch-sensitive input device of the electronic device. The instructions also cause the controller to rotate an input axis associated with the touch-sensitive input device from a first orientation to a second orientation based on the detected direction, where a vertical axis of the input axis is aligned with the side in the second orientation. Thus, the convenience of using the touch-sensitive input device may be increased.

Figure 1:
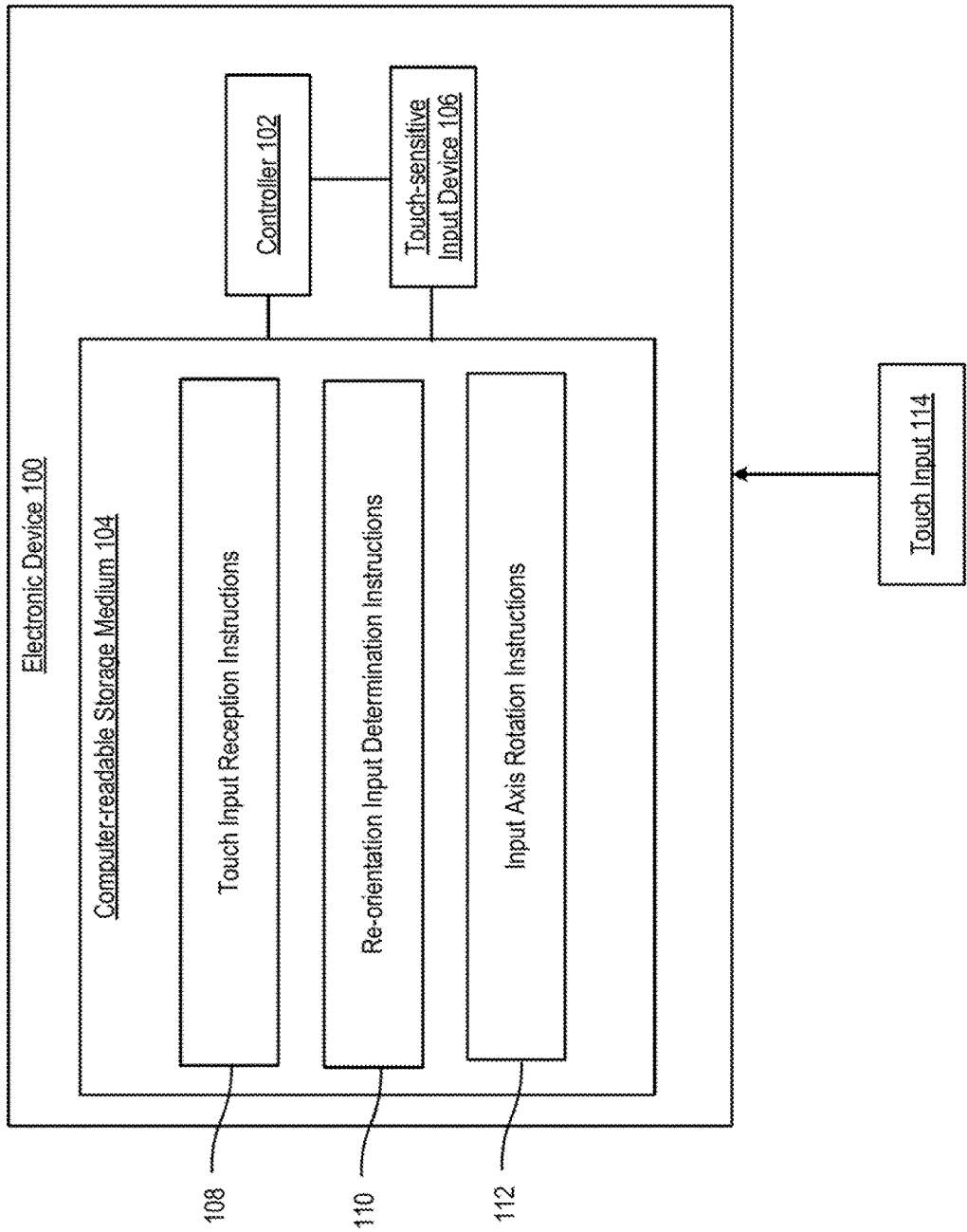
FIG. 1 illustrates an electronic device with a touch-sensitive input device that rotates an input axis based on a re-orientation input, according to an example.

FIG. 1 illustrates an electronic device 100 with a touch-sensitive input device that rotates an input axis based on a re-orientation input, according to an example. Electronic device 100 may be, for example, a desktop computer, an all-in-one computer, a tablet computing device, a mobile phone, a display, or any other electronic device suitable to receive touch inputs. Electronic device 100 may include a controller 102, a computer-readable storage medium 104, and a touch-sensitive input device 106.

Controller 102 may be a central processing unit (CPU), a semiconductor-based microprocessor, and/or other hardware devices suitable for retrieval and execution of instructions stored in computer-readable storage medium 104. Controller 102 may fetch, decode, and execute instructions 108, 110, and 112 to control a process of rotating an input axis of touch-sensitive input device 106. As an alternative or in addition to retrieving and executing instructions, controller 102 may include at least one electronic circuit that includes electronic components for performing the functionality of instructions 108, 110, 112, or a combination thereof.

Computer-readable storage medium 104 may be any electronic, magnetic, optical, or other physical storage device that contains or stores executable instructions. Thus, computer-readable storage medium 104 may be, for example, Random Access Memory (RAM), an Electrically Erasable Programmable Read-Only Memory (EEPROM), a storage device, an optical disc, etc. In some examples, computer-readable storage medium 104 may be a non-transitory storage medium, where the term "non-transitory" does not encompass transitory propagating signals. As described in detail below, computer-readable storage medium 104 may be encoded with a series of processor executable instructions 108-112.

Touch-sensitive input device 106 may be a touchpad, a touchscreen, or any other electronic device suitable to translate the movements of a writing tool (e.g., a user's finger or a stylus) to a relative position in a GUI based on an input axis. An example of an input axis is described in more detail in FIGS. 2A-2B.

Touch input reception instructions 108 may receive a touch input 114 via touch-sensitive input device 106. Re-orientation input determination instructions 110 may determine whether touch input 114 corresponds to a re-orientation input. A re-orientation input may have a distinct characteristic. For example, a re-orientation input may correspond to a tapping gesture on touch-sensitive input device 106. As another example, a re-orientation input may correspond to a two finger swipe from one side of touch-sensitive input device 106 to another side of touch-sensitive input device 106.

When re-orientation input determination instructions 110 detect the distinct characteristic, re-orientation input determination instructions 110 may determine that a re-orientation input has been received. In response to a determination that touch input 114 corresponds to a re-orientation input, input axis rotation instructions 112 may rotate the input axis of touch-sensitive input device 106 from a first orientation to a second orientation based on the re-orientation input. For example, input axis rotation instructions 112 may identify a location of the re-orientation input in touch-sensitive input device 106. Input axis rotation instructions 112 may determine an anchor point based on the location and rotate the input axis based on the anchor point from a first orientation to a second orientation. A vertical axis of the input axis may be aligned with the anchor point in the second orientation.

Figure 2A:
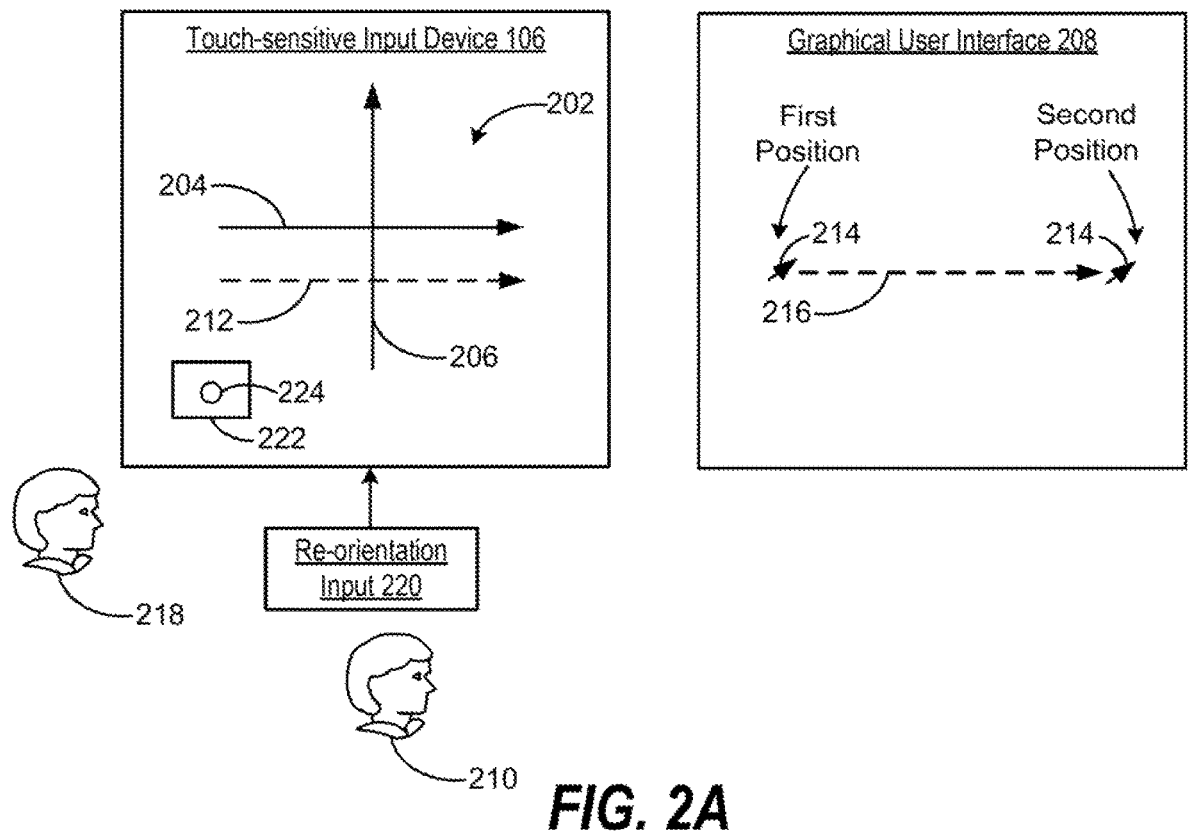
FIGS. 2A-2B illustrate a process of the touch-sensitive input device of FIG. 1 rotating an input axis based on a re-orientation input, according to an example.
Figure 2B:
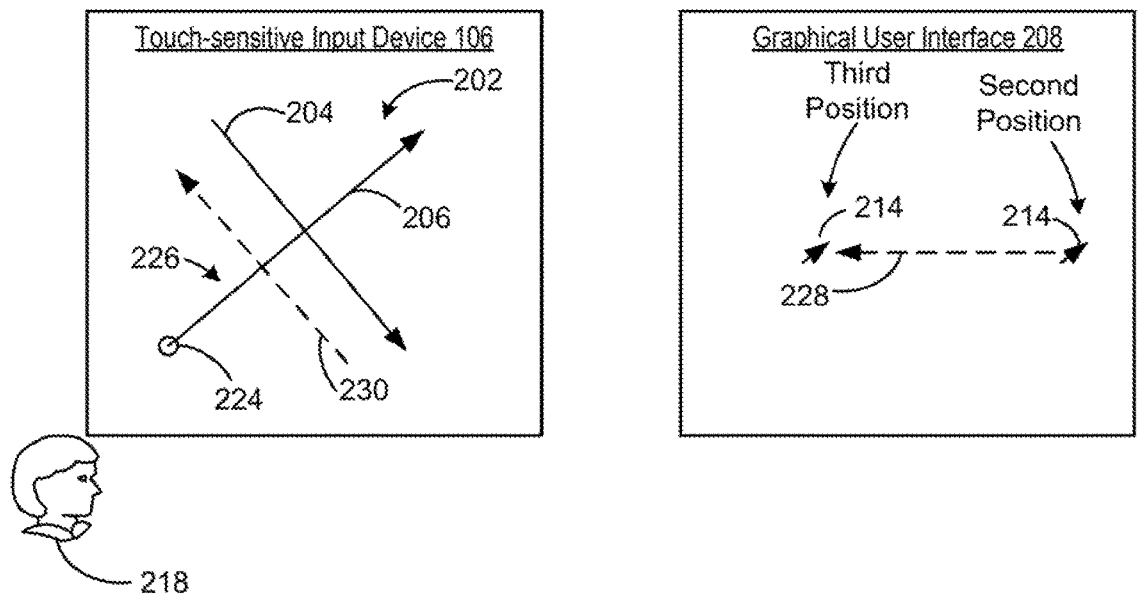

FIGS. 2A-2B illustrate a process of touch-sensitive input device 106 rotating an input axis based on a re-orientation input, according to an example. In FIG. 2A, touch-sensitive input device 106 may include an input axis 202. Input axis 202 may be virtual and may be implemented using instructions executable by a controller, such as controller 102 of FIG. 1. In some examples, input axis 202 may not be visible to a user of touch-sensitive input device 106. Input axis 202 may be a two dimensional axis. Input axis 202 may include a horizontal axis 204 and a vertical axis 206.

Input axis 202 may determine how movements detected on touch-sensitive input device 106 is translated to a relative position in a GUI 208. GUI 208 may be shown in a display attached to electronic device 100. For example, input axis 202 may be in a first orientation as shown in FIG. 2A. In the first orientation, input axis 202 may be aligned with a first user 210. When a first user 210 of touch-sensitive input device 106 moves a finger across touch-sensitive input device 106 (as shown by an arrow 212), a pointer 214 may move across GUI 208 from a first position to a second position (as shown by an arrow 216).

When a second user 218 is to use touch-sensitive input device 106, second user 218 may re-orient input axis 202 to better suit second user's 218 position relative to touch-sensitive input device 106. As shown in FIG. 2A, second user 218 may physically face a corner of touch-sensitive input device 106 and may not be aligned with input axis 202 in the first orientation. Second user 218 may provide a re-orientation input 220 to touch-sensitive input device 106 to re-align input axis 202 with second user 218.

Touch-sensitive input device 106 may identify that re-orientation input 220 is received at a location 222 in touch-sensitive input device 106. Location 222 may correspond to a region of touch-sensitive input device 106 where re-orientation input 220 initially makes physical contact with touch-sensitive input device 106. Touch-sensitive input device 106 may determine an anchor point 224 based on location 222. Anchor point 224 may be a location in touch-sensitive input device 106 that serves as a reference point to re-orient input axis 202. For example, anchor point 224 may be a center of location 222.

Turning to FIG. 2B, touch-sensitive input device 106 may rotate input axis 202 to a second orientation based on anchor point 224 while touch-sensitive input device 106 and electronic device 100 are to remain stationary. In the second orientation, vertical axis 206 of input axis 202 may align with anchor point 224 such that a proximal side 226 of vertical axis 206 is to intersect anchor point 224. Proximal side 226 may be a side of vertical axis 206 that is below horizontal axis 204. In the second orientation, input axis 202 is aligned with second user 218. Thus, second user 218 may navigate GUI 208 without having to physically re-orient touch-sensitive input device 106. For example, to move pointer 214 from the second position to a third position (as shown by arrow 228), second user 218 may move a finger across touch-sensitive input device 106 (as shown by an arrow 230).

Figure 3:
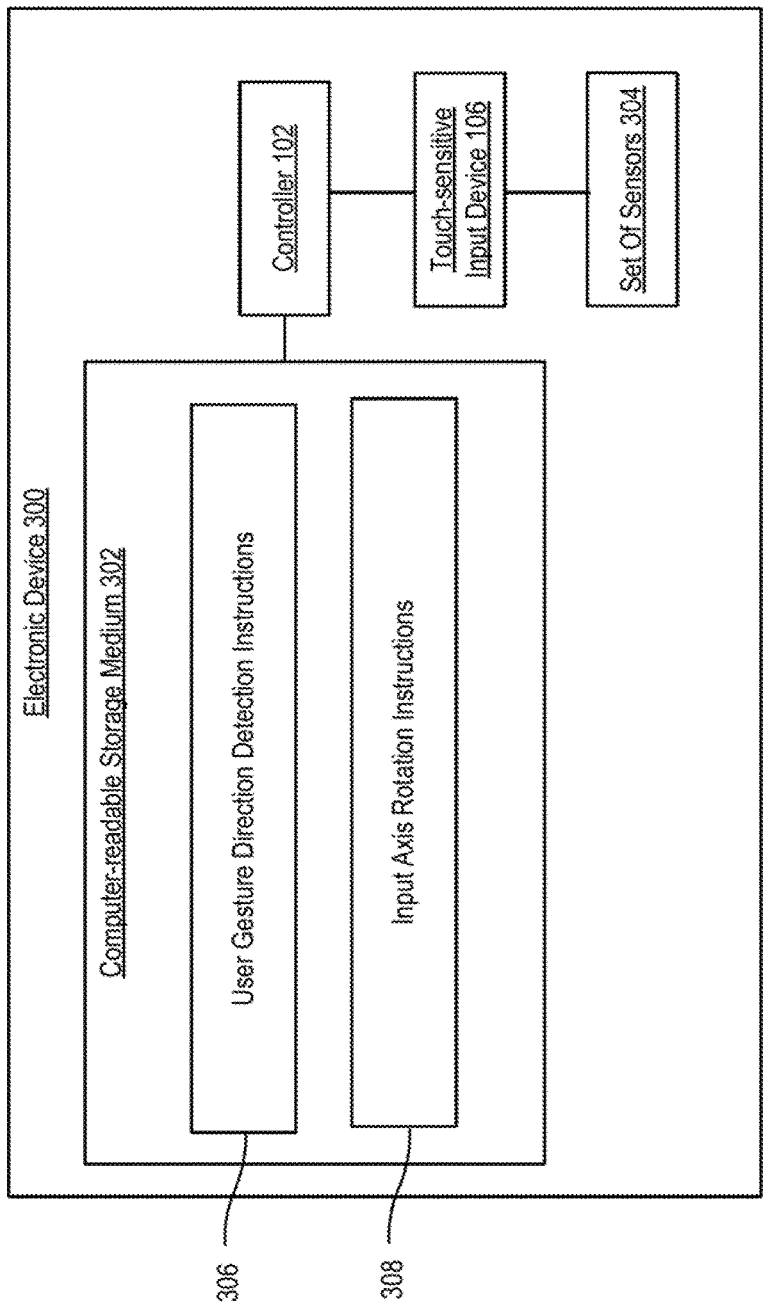
FIG. 3 illustrates an electronic device with a touch-sensitive input device that rotates an input axis based on a triggering of a sensor, according to an example.

FIG. 3 illustrates an electronic device 300 with a touch-sensitive input device that rotates an input axis based on a triggering of a sensor, according to an example. Electronic device 300 may be similar to electronic device 100 of FIG. 1. Electronic device 300 may include controller 102, touch-sensitive input device 106, a computer-readable storage medium 302, and a set of sensors 304. Computer-readable storage medium 302 may be similar to computer-readable storage medium 104. A set of sensors 304 may include a plurality of sensors. Examples of set of sensors 304 are described in more detail in FIGS. 4 and 6. Set of sensors 304 may be light-sensitive sensors that surround touch-sensitive input device 106. Computer-readable storage medium 302 may be encoded with a series of processor executable instructions 306-308.

User gesture direction detection instructions 306 may detect a direction of a user gesture relative to touch-sensitive input device 106 based on a triggering of a sensor in set of sensors 304. Input axis rotation instructions 308 may determine an anchor point based on the detected direction. Input axis rotation instructions 308 may also rotate an input axis of touch-sensitive input device 106 based on the anchor point.

Figure 4:
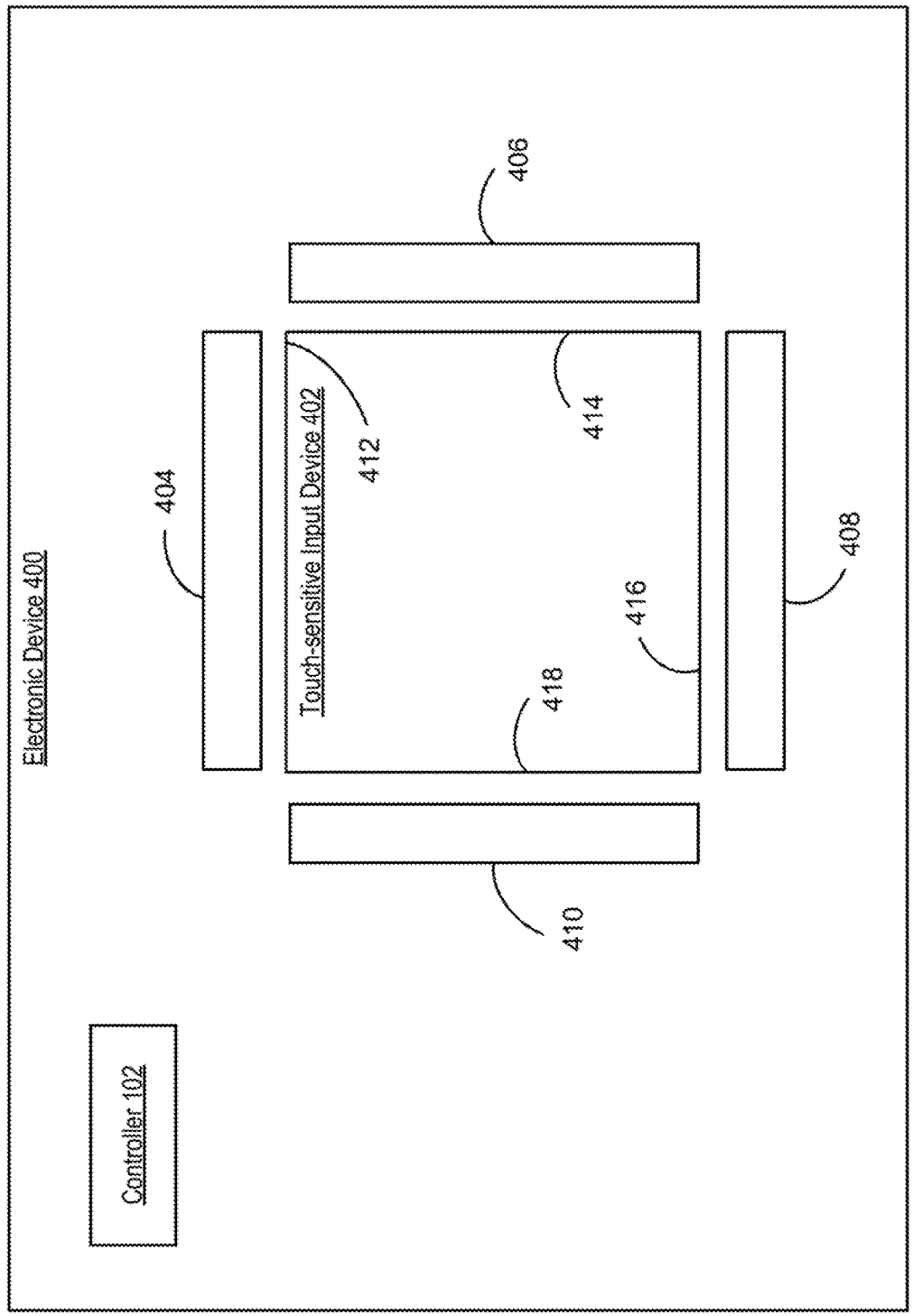
FIG. 4 illustrates an electronic device with a touch-sensitive input device that rotates an input axis based on a triggering of a sensor, according to another example.

FIG. 4 illustrates an electronic device 400 with a touch-sensitive input device that rotates an input axis based on a triggering of a sensor, according to another example. Electronic device 400 may implement electronic device 300 of FIG. 3. Electronic device 400 may include controller 102, a touch-sensitive input device 402, and a plurality of sensors 404-410 that surrounds touch-sensitive input device 402. Touch-sensitive input device 402 may be similar to touch-sensitive input device 106. Each of sensors 404-410 may be a light-sensitive sensor that is triggered (e.g., generates a voltage) in response to a change in light intensity detected at the light-sensitive sensor. For example, each of sensors 404-410 may be implemented using a photo transistor that detects shadow.

Touch-sensitive input device 402 may have a square sharp or a rectangular shape. Touch-sensitive input device 402 may have a first side 412, a second side 414, a third side 416, and a fourth side 418. Each of sides 412-418 may be aligned with a distinct sensor from the plurality of sensors 404-410. For example, a first sensor 404 is aligned with first side 412, a second sensor 406 is aligned with second side 414, a third sensor 408 is aligned with third side 416, and a fourth sensor 410 is aligned with fourth side 418.

During operation, sensors 404-410 may detect a direction of a user gesture relative to touch-sensitive input device 402 so that touch-sensitive input device 402 may rotate to align with the direction of the user gesture, as described in more detail in FIGS. 5A-5D.

FIGS. 5A-5B illustrate a process of touch-sensitive input device 402 rotating an input axis based on a triggering of a sensor, according to an example. Turning to FIG. 5A, touch-sensitive input device 402 may include input axis 202. Input axis 202 may be in a first orientation. To re-orient input axis 202, a user 502 of touch-sensitive input device 402 facing second side 414 of touch-sensitive input device 402 may reach a hand or a finger towards touch-sensitive input device 402. When the hand or finger hover over second sensor 406, second sensor 406 may detect a shadow caused by the hand or finger. In response to detecting the shadow, second sensor 406 may be triggered. The triggering of second sensor 406 may indicate that the direction of the hand or finger is coming from second side 414. Based on the detected direction, touch-sensitive input device 402 may rotate input axis 202, as described in more detail in FIG. 5B.

Touch-sensitive input device 402 may determine an anchor point 504 based on the detected direction. For example, since second sensor 406 is triggered, touch-sensitive input device 402 may determine that the direction of user's 502 hand or finger is coming from second side 414. In some examples, anchor point 504 may be located at a mid-point of second side 414. In some examples, anchor point 504 may be located anywhere in a region of touch-sensitive input device 402 that is aligned with second sensor 406. Touch-sensitive input device 402 may rotate input axis 202 from the first orientation to a second orientation to align vertical axis 206 with anchor point 504. In the second orientation, proximal side 226 may intersect with anchor point 504.

Turning to FIG. 5C, another example of touch-sensitive input device 402 rotating input axis 202 based on a triggering of a sensor is described. In FIG. 5C, user 502 may face fourth side 418 of touch-sensitive input device 402. In response to detecting breaking light caused by a hand or finger of user 502, fourth sensor 410 may be triggered. In response to the triggering of fourth sensor 410, touch-sensitive input device 402 may determine that the direction of user's 502 hand or finger is coming from fourth side 418. Thus, touch-sensitive input device 402 may determine an anchor point 506 based on the detected direction. Touch-sensitive input device 402 may rotate input axis 202 from the first orientation to a third orientation to align vertical axis 206 with anchor point 506. In the third orientation, proximal side 226 may intersect with anchor point 506.

Turning to FIG. 5D, another example of touch-sensitive input device 402 rotating input axis 202 based on a triggering of a sensor is described. Electronic device 400 may further include a set of indicators 508, 510, 512, and 514. Each of indicators 508-514 may be aligned with a corresponding side of touch-sensitive input device 402. For example, a first indicator 508 may be aligned with first side 412, a second indicator 510 may be aligned with second side 414, a third indicator 512 may be aligned with third side 416, and a fourth indicator 514 may be aligned with fourth side 418.

Indicators 508-514 may be implemented using light emitting diodes. Indicators 508-514 may provide a visual indication of which side of touch-sensitive input device 402 proximal side 226 is aligned with. Thus, a user of touch-sensitive input device 402 may determine the current orientation of touch-sensitive input device 402 using indicators 508-514. For example, proximal side 226 may be aligned with third side 416 initially. Third indicator 512 may light up. Input axis 202 may be rotated as described in FIGS. 5A-5C and proximal side 226 may be aligned with fourth side 418 after the rotation. Thus, third indicator 512 may turn dark and fourth indicator 514 may light up.

Figure 6:
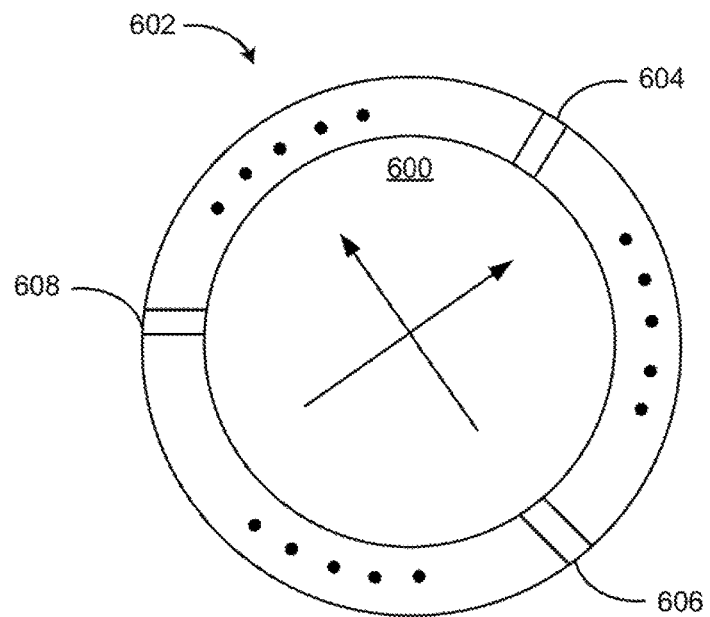
FIG. 6 illustrates a touch-sensitive input device that rotates an input axis based on a triggering of a sensor, according to another example.

FIG. 6 illustrates a touch-sensitive input device 600 that rotates an input axis based on a triggering of a sensor, according to another example. Touch-sensitive input device 600 may have a circular shape. A band of sensors 602 may surround touch-sensitive input device 600. Band of sensors 602 may include a plurality of sensors, such as sensors 604, 606, and 608. Band of sensors may be light-sensitive sensors. Operations of touch-sensitive input device 600 and band of sensors 602 may be similar to touch-sensitive input device 402 and set of sensors 404-410 of FIG. 4. However, compared to set of sensors 404-410, band of sensors 602 may include more sensors. Thus, direction of gesture from a user may be more precisely detected and an anchor point to align an input axis of touch-sensitive input device 600 may be more precisely placed in touch-sensitive input device 600.

In some examples, when contiguous sensors of band of sensors 602 detect a shadow, touch-sensitive input device 600 may determine an anchor in different manners based on the number of the contiguous sensors. When an odd number of contiguous sensors of band of sensors 602 detect a shadow, the middle sensor among the contiguous sensors may define an anchor point. When an even number of contiguous sensors detect a shadow, a halfway point between the middle two sensors may define the anchor point.

The use of "comprising", "including" or "having" are synonymous and variations thereof herein are meant to be inclusive or open-ended and do not exclude additional unrecited elements or method steps.

What is claimed is:

1. A non-transitory computer-readable storage medium comprising instructions that when executed cause an electronic device to:
   receive, via a touch-sensitive input device associated with an input axis at a first orientation, a first touch input comprising a swipe across the touch-sensitive input device along a first input device axis;
   in response to the first touch input, cause a pointer in a graphical user interface (GUI) displayed in a display device to move along a first GUI axis, wherein the display device is separate from the touch-sensitive input device;
   detect a re-orientation input;
   in response to detecting the re-orientation input, rotate the input axis associated with the touch-sensitive input device from the first orientation to a second orientation that is different from the first orientation;
   receive, via the touch-sensitive input device associated with the input axis at the second orientation, a second touch input comprising a swipe across the touch-sensitive input device along a second input device axis that is different from the first input device axis; and
   in response to the second touch input, cause the pointer in the GUI displayed in the display device to also move along the first GUI axis.

2. The non-transitory computer-readable storage medium of claim 1, wherein the instructions when executed further cause the electronic device to:
   identify a location of the re-orientation input relative to the touch-sensitive input device;
   determine an anchor point based on the location; and
   rotate the input axis based on the anchor point, wherein a vertical axis of the input axis is aligned with the anchor point in the second orientation.

3. The non-transitory computer-readable storage medium of claim 2, wherein the input axis comprises the vertical axis and a horizontal axis.

4. The non-transitory computer-readable storage medium of claim 1, wherein the electronic device is to remain stationary when the input axis is rotated.

5. The non-transitory computer-readable storage medium of claim 1, wherein the detecting of the re-orientation input is according to a direction of a user gesture relative to a side of a touch-sensitive input device of the electronic device, based on measurements of a subset of a plurality of light-sensitive sensors, and wherein the subset comprises multiple light-sensitive sensors of the plurality of light-sensitive sensors, and wherein the instructions when executed cause the electronic device to determine an anchor point defined by a position of a sensor in the subset, and wherein the input axis intersects the anchor point.

6. The non-transitory computer-readable storage medium of claim 5, wherein if the subset includes an odd number of light-sensitive sensors, a middle light-sensitive sensor of the odd number of light-sensitive sensors defines the anchor point.

7. The non-transitory computer-readable storage medium of claim 5, wherein if the subset includes an even number of light-sensitive sensors, middle light-sensitive sensors of the even number of light-sensitive sensors define the anchor point.

8. The non-transitory computer-readable storage medium of claim 5, wherein the plurality of light-sensitive sensors are arranged as a circular band of sensors around the touch-sensitive input device.

9. The non-transitory computer-readable storage medium of claim 5, wherein a first sensor of the plurality of sensors is aligned with a first side of a plurality of sides of the touch-sensitive input device, and a second sensor of the plurality of sensors is aligned with a second side of the plurality of sides, wherein the user gesture comprises a hand or finger of a user reaching across the first sensor and towards the touch-sensitive input device, and wherein the detected direction crosses the first side, wherein a first axis of the input axis when in the second orientation is aligned with the first side, and a second axis of the input axis when in the second orientation intersects the anchor point, and wherein the first axis of the input axis when in the first orientation is aligned with the second side, and the second axis of the input axis when in the first orientation intersects an anchor point defined by the second sensor aligned with the second side.

10. An electronic device comprising:
a touch-sensitive input device;
a display device separate from the touch-sensitive input device;
a plurality of sensors surrounding the touch-sensitive input device; and
a controller coupled to the touch-sensitive input device and the plurality of sensors, wherein the controller is to:
receive, via the touch-sensitive input device associated with an input axis at a first orientation, a first touch input comprising a swipe across the touch-sensitive input device along a first input device axis,
in response to the first touch input, cause a pointer in a graphical user interface (GUI) displayed in the display device to move along a first GUI axis,
detect, via a subset of the plurality of sensors, a direction of a user gesture relative to a side of the touch-sensitive input device, wherein the subset comprises multiple sensors of the plurality of sensors,
determine an anchor point that is defined by a position of a sensor in the subset,
rotate the input axis associated with the touch-sensitive input device from the first orientation to a second orientation based on the detected direction, wherein a first axis of the input axis when in the second orientation intersects the anchor point,
receive, via the touch-sensitive input device associated with the input axis at the second orientation, a second touch input comprising a swipe across the touch-sensitive input device along a second input device axis that is different from the first input device axis, and
in response to the second touch input, cause the pointer in the GUI displayed in the display device to also move along the first GUI axis.

11. The electronic device of claim 10, wherein the plurality of sensors comprise light-sensitive sensors.

12. The electronic device of claim 10, further comprising:
a plurality of indicators that are selectively activated to indicate to which side of the touch-sensitive input device the input axis is aligned.

13. The electronic device of claim 10, wherein the input axis comprises the first axis and a second axis that is perpendicular to the first axis.

14. The electronic device of claim 10, wherein a first sensor of the plurality of sensors is aligned with a first side of a plurality of sides of the touch-sensitive input device, and a second sensor of the plurality of sensors is aligned with a second side of the plurality of sides, wherein the user gesture comprises a hand or finger of a user reaching across the first sensor and towards the touch-sensitive input device, and wherein the detected direction crosses the first side, wherein a second axis of the input axis when in the second orientation is aligned with the first side, and wherein the second axis of the input axis when in the first orientation is aligned with the second side, and the first axis of the input axis when in the first orientation intersects an anchor point defined by the second sensor aligned with the second side.

15. The electronic device of claim 10, wherein if the subset includes an odd number of sensors, a middle sensor of the odd number of sensors defines the anchor point.

16. The electronic device of claim 10, wherein if the subset includes an even number of sensors, middle sensors of the even number of sensors define the anchor point.

17. The electronic device of claim 10, wherein the plurality of sensors are arranged as a circular band of sensors around the touch-sensitive input device.

18. An electronic device comprising:
a touch-sensitive input device;
a display device separate from the touch-sensitive input device; and
a controller to:
receive, via the touch-sensitive input device associated with an input axis at a first orientation, a first touch input comprising a swipe across the touch-sensitive input device along a first input device axis,
in response to the first touch input, cause a pointer in a graphical user interface (GUI) displayed in the display device to move along a first GUI axis,
detect a re-orientation input,
in response to detecting the re-orientation input, rotate the input axis associated with the touch-sensitive input device from the first orientation to a second orientation that is different from the first orientation,
receive, via the touch-sensitive input device associated with the input axis at the second orientation, a second touch input comprising a swipe across the touch-sensitive input device along a second input device axis that is different from the first input device axis, and in response to the second touch input, cause the pointer in the GUI displayed in the display device to also move along the first GUI axis.

19. The electronic device of claim 18, wherein the controller is to:

identify a location of the re-orientation input relative to the touch-sensitive input device;

determine an anchor point based on the location; and rotate the input axis based on the anchor point, wherein a vertical axis of the input axis is aligned with the anchor point in the second orientation.

20. The electronic device of claim 19, wherein the input axis comprises the vertical axis and a horizontal axis.

\* \* \* \* \*